United States Patent [19]

Edmonds, Jr.

[11] 4,038,262
[45] July 26, 1977

[54] PRODUCTION OF ARYLENE SULFIDE POLYMERS

[75] Inventor: James T. Edmonds, Jr., Bartlesville, Okla.

[73] Assignee: Phillips Petroleum Company, Bartlesville, Okla.

[21] Appl. No.: 581,338

[22] Filed: May 27, 1975

[51] Int. Cl.$^2$ .............................................. C08G 75/16
[52] U.S. Cl. .............................. 260/79.1; 260/45.7 R; 260/79
[58] Field of Search ..................... 260/79, 79.1, 45.7 R

[56] References Cited

U.S. PATENT DOCUMENTS

| | | | |
|---|---|---|---|
| 3,354,129 | 11/1967 | Edmonds, Jr. et al. | 260/79 |
| 3,763,124 | 10/1973 | Edmonds, Jr. | 260/79.1 |
| 3,786,035 | 1/1974 | Scoggin | 260/79.1 |
| 3,919,177 | 11/1975 | Campbell | 260/79.1 |

*Primary Examiner*—Melvyn I. Marquis

[57] ABSTRACT

A method by which arylene sulfide polymers are produced by admixing p-dihalobenzene, optionally together with a polyhalo aromatic compound having more than two halogen substituents per molecule, an alkali metal sulfide, an alkali metal carboxylate or a lithium halide, an alkali metal hydroxide, and N-methyl-2-pyrrolidone at polymerization conditions with the addition of carbon dioxide either during the polymerization or upon completion of the polymerization but prior to removal of N-methyl-2-pyrrolidone by distillation at elevated temperatures thereby producing a polymer, after washing, of lower melt flow than is obtained without the addition of carbon dioxide. In an embodiment of the invention the use of carbon dioxide makes unnecessary the use of vacuum distillation in recovering N-methyl-2-pyrrolidone from the reaction effluent and also makes possible improved recovery of N-methyl-2-pyrrolidone.

12 Claims, No Drawings

PRODUCTION OF ARYLENE SULFIDE POLYMERS

BACKGROUND OF THE INVENTION

This invention relates to the production of arylene sulfide polymers. In one of its aspects this invention relates to a novel method for producing novel arylene sulfide polymers, and to the polymers themselves. In another of its aspects this invention relates to the use of carbon dioxide admixed into the polymerization mixture in the production of arylene sulfide polymers. In another of its aspects this invention relates to producing arylene sulfide polymers of lower melt flow by using a specific chemical compound in the reaction mixture than is produced without the use of the specific chemical compound.

The preparation of arylene sulfide polymers having lower melt flow without curing the polymers as compared to arylene sulfide polymers known in the art is of particular interest since lower melt flows, particularly within the range of about 1 to about 700 as determined by the method of ASTM D 1238-70, are particularly useful in the production of fibers, molded objects and films since the usual curing step is obviated. It is also important in the production of arylene sulfide polymers to facilitate the recovery of N-methyl-2-pyrrolidone which can then be reused in later polymerization.

It is therefore an object of this invention to produce arylene sulfide polymers of lower melt flow as compared to that of those produced by prior art methods. It is another object of this invention to improve the recovery of N-methyl-2-pyrrolidone in the production of arylene sulfide polymers.

Other aspects, objects and the various advantages of this invention will become apparent on reading this specification and the appended claims.

STATEMENT OF THE INVENTION

In accordance with this invention, in the production of an arylene sulfide polymer by forming a composition by contacting (1) a p-dihalobenzene, optionally together with a polyhalo aromatic compound having more than two halogen substituents per molecule; (2) an alkali metal sulfide; (3) an alkali metal carboxylate or a lithium halide; (4) an alkali metal hydroxide; and (5) N-methyl-2-pyrrolidone at polymerization conditions, the addition of carbon dioxide during the polymerization or upon completion of the polymerization, but prior to removal of N-methyl-2-pyrrolidone by distillation at elevated temperatures, particularly at temperatures above about 200° C, results in recovery of a polymer, upon washing, of lower melt flow than obtained without the addition of carbon dioxide. The use of carbon dioxide serves to inhibit decomposition of the arylene sulfide polymer subjected to elevated temperatures during the recovery of N-methyl-2-pyrrolidone, thereby making unnecessary the use of vacuum distillation in N-methyl-2-pyrrolidone recovery. Additionally, use of the carbon dioxide makes possible improved recovery of N-methyl-2-pyrrolidone.

In one embodiment of the present invention, in the reaction of at least one p-dihalobenzene, optionally together with a minor amount of a polyhalo aromatic compound having more than two halogen substituents per molecule, under polymerization conditions for a period of time sufficient to form an arylene sulfide polymer, with a mixture in which at least one alkali metal sulfide, at least one alkali metal salt selected from alkali metal carboxylates and lithium halides, at least one alkali metal hydroxide, and N-methyl-2-pyrrolidone are contacted, carbon dioxide is added during the polymerization and/or upon completion of the polymerization, but prior to removal of N-methyl-2-pyrrolidone by distillation from the polymerization mixture at a temperature above about 200° C, followed by washing of the residual polymer.

p-Dihalobenzenes which can be employed in the process of this invention can be represented by the formula

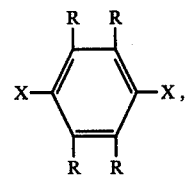

where each X is selected from the group consisting of chlorine, bromine, and iodine, and each R is selected from the group consisting of hydrogen and hydrocarbyl in which the hydrocarbyl can be an alkyl, cycloalkyl, or aryl radical or combination thereof such as alkaryl, aralkyl, or the like, the total number of carbon atoms in each molecule being within the range of 6 to about 24, with the proviso that in at least 50 mole percent of the p-dihalobenzene employed each R must be hydrogen.

Examples of some p-dihalobenzenes which can be employed in the process of this invention include p-dichlorobenzene, p-dibromobenzene, p-diiodobenzene, 1-chloro-4-bromobenzene, 1-chloro-4-iodobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetramethyl-3,6-dichlorobenzene, 1-butyl-4-cyclohexyl-2,5-dibromobenzene, 1-hexyl-3-dodecyl-2,5-dichlorobenzene, 1-octadecyl-2,5-diiodobenzene, 1-phenyl-2-chloro-5-bromobenzene, 1-p-tolyl-2,5-dibromobenzene, 1-benzyl-2,5-dichlorobenzene, 1-octyl-4-(3-methylcyclopentyl)-2,5-dichlorbenzene, and the like, and mixtures thereof.

Polyhalo aromatic compounds having more than two halogen substituents per molecule which can be employed in the process of this invention can be represented by the formula $R'X'_n$, where each X' is selected from the group consisting of chlorine and bromine, preferably chlorine, $n$ is an integer of 3 to 6, and R' is a polyvalent aromatic radical of valence $n$ which can have up to about 4 methyl substituents, the total number of carbon atoms in R' being within the range of 6 to about 16.

Examples of some polyhalo aromatic compounds having more than two halogen substituents per molecule which can be employed in the process of this invention include 1,2,3-trichlorobenzene, 1,2,4-trichlorobenzene, 1,3-dichloro-5-bromobenzene, 2,4,6-trichlorotoluene, 1,2,3,5-tetrabromobenzene, hexachlorobenzene, 1,3,5-trichloro-2,4,6-trimethylbenzene, 2,2',4,4'-tetrachlorobiphenyl, 2,2',6,6'-tetrabromo-3,3',5,5'-tetramethylbiphenyl, 1,2,3,4-tetrachloronaphthalene, 1,2,4-tribromo-6-methylnaphthalene, and the like, and mixtures thereof.

Alkali metal sulfides which can be employed in the process of this invention include lithium sulfide, sodium sulfide, potassium sulfide, rubidium sulfide, cesium sulfide, and mixtures thereof. Preferably, the alkali metal sulfide is used as a hydrate or as an aqueous mixture. If desired, the alkali metal sulfide can be prepared as an aqueous solution by the reaction of an alkali metal hydroxide with an alkali metal bisulfide in aqueous solution.

Alkali metal carboxylates which can be employed in the process of this invention can be represented by the formula R"CO$_2$M, where R" is a hydrocarbyl radical selected from alkyl, cycloalkyl, and aryl, and combinations thereof such as alkaryl, aralkyl, and the like, the number of carbon atoms in said R" being within the range of 1 to about 20, and M is an alkali metal selected from lithium, sodium, potassium, rubidium, and cesium. If desired, the alkali metal carboxylate can be employed as a hydrate or as a solution or dispersion in water.

Examples of some alkali metal carboxylates which can be employed in the process of this invention include lithium acetate, sodium acetate, potassium acetate, lithium propionate, sodium propionate, lithium 2-methylpropionate, rubidium butyrate, lithium valerate, sodium valerate, cesium hexanoate, lithium heptanoate, lithium 2-methyloctanoate, potassium dodecanoate, rubidium 4-ethyltetradecanoate, sodium octanoate, sodium heneicosanoate, lithium cyclohexanecarboxylate, cesium cyclododecanecarboxylate, sodium 3-methylcyclopentanecarboxylate, potassium cyclohexylacetate, potassium benzoate, lithium benzoate, sodium benzoate, potassium m-toluate, lithium phenylacetate, sodium 4-phenylcyclohexanecarboxylate, potassium p-tolylacetate, lithium 4-ethylcyclohexylacetate, and the like, and mixtures thereof.

Lithium halides which can be employed in the process of this invention include lithium chloride, lithium bromide, lithium iodide, and mixtures thereof.

Alkali metal hydroxides which can be employed in the process of this invention includes lithium hydroxide, sodium hydroxide, potassium hydroxide, rubidium hydroxide, cesium hydroxide, and mixtures thereof.

Although the mole ratio of p-dihalobenzene to alkali metal sulfide can vary over a considerable range, generally it will be within the range of about 0.9:1 to about 2:1, preferably about 0.95:1 to about 1.2:1. When a polyhalo aromatic compound having more than two halogen substituents per molecule is employed, generally it will be used in an amount up to about 0.6 part by weight per 100 parts by weight p-dihalobenzene, preferably about 0.1 to about 0.4 part by weight per 100 parts by weight p-dihalobenzene. Although the mole ratio of alkali metal salt selected from alkali metal carboxylates and lithium halides to alkali metal sulfide can vary over a considerable range, generally it will be within the range of about 0.05:1 to about 4:1, preferably about 0.1:1 to about 2:1. The mole ratio of alkali metal hydroxide to alkali metal sulfide can vary over a wide range, but generally will be within the range of about 0.008:1, preferably about 0.015:1 to about 0.6:1. The amount of N-methyl-2-pyrrolidone can vary greatly, generally being within the range of about 100 kilograms to about 2500 kilograms per kilogram-mole of alkali metal sulfide. The mole ratio of carbon dioxide to alkali metal hydroxide can vary considerably but generally will be at least 0.5:1, preferably being within the range of about 0.5:1 to about 1:1.

Although the reaction temperature at which the polymerization is conducted can vary over a wide range, generally it will be within the range of about 220° C to about 330° C, preferably about 230° C to about 300° C. The reaction time can vary widely, depending in part on the reaction temperature, but generally will be within the range of about 10 minutes to about 72 hours, preferably about 1 hour to about 8 hours. The pressure should be sufficient to maintain the N-methyl-2-pyrrolidone, the p-dihalobenzene, and the polyhalo aromatic compound having more than two halogen substituents per molecule, if used, substantially in the liquid phase.

In the process of this invention it is desirable that a dehydration step, i.e., distillation of water, be conducted on a mixture comprising the alkali metal sulfide and N-methyl-2-pyrrolidone, preferably together with the alkali metal hydroxide. Although the alkali metal salt selected from alkali metal carboxylates and lithium halides can be added before or after the dehydration step, it is preferable to add said alkali metal salt before the dehydration if it is an alkali metal carboxylate in hydrated form, and it is preferable to add said alkali metal salt after the dehydration step if it is a lithium halide. When an alkali metal carboxylate in hydrated form is employed, it is preferable that this salt forming a composition with N-methyl-2-pyrrolidone be dehydrated in one step to form a first dehydrated composition, followed by addition of the alkali metal hydroxide and the alkali metal sulfide in hydrated form or as an aqueous mixture to form a second composition and then a second dehydration step to form a second dehydrated composition. When thus carried out in two steps, the dehydration is conducted with less foaming than that encountered when the dehydration is conducted in a single step. The p-dihalobenzene should be added after the dehydration step(s). If used, the polyhalo aromatic compound having more than two halogen substituents per molecule can be added to the polymerization reactor at substantially the same time as the p-dihalobenzene, or it can be added incrementally or all at once during the course of the polymerization, after polymerization of the p-dihalobenzene has begun. The carbon dioxide should be added during the polymerization or upon completion of the polymerization, but prior to removal of the N-methyl-2-pyrrolidone by distillation. Preferably, the carbon dioxide is added gradually in order to avoid a high pressure in the polymerization reactor. After the polymerization step and the addition of carbon dioxide have been completed, the N-methyl-2-pyrrolidone, as well as any water which is present, is distilled, and the residual product is washed with water and dried to give the desired arylene sulfide polymer. In a preferred procedure, distillation of the N-methyl-2-pyrrolidone and any water therein is conducted in a manner similar to that used in U.S. Pat. No. 3,839,302. For example, the polymerization reaction mixture at an initial temperature within the range of about 220° C to about 330° C can be concentrated by reducing the pressure sufficiently, e.g., to a pressure within the range of about 0 psig to about 30 psig, to distill some of the N-methyl-2-pyrrolidone and any water present. Steam can then be passed into the residual mixture to a pressure of, e.g., 140-160 psig, to inhibit discoloration during further processing. The mixture can then be reheated to a temperature within the range of about 220° C to about 330° C under autogenous pressure. The pressure on the mixture can then be reduced to approximately atmospheric pressure to distill the water and most of the remaining N-methyl-2-pyrrolidone. Remaining N-methyl-2-pyrrolidone can be evaporated readily by heating the residual product, e.g., at a temperature within the range of about 205° C to about 250° C, after which the residual product can be washed with water to remove inorganic salt and dried, thereby providing the arylene sulfide polymer in substantially pure form. N-methyl-2-pyrrolidone recovered from the polymerization reaction mixture can be recycled to the polymerization reactor.

Not only does use of carbon dioxide in the process of this invention result in an arylene sulfide polymer of lower melt flow, but it also enables better recovery of the N-methyl-2-pyrrolidone. More specifically, carbon dioxide reacts with the alkali metal salt of N-methyl-4-aminobutyric acid, produced by cleavage of N-methyl-2-pyrrolidone, to permit recyclization to N-methyl-2-pyrrolidone, which can then be recovered.

The arylene sulfide polymers produced by the process of this invention can be blended with fillers, pigments, extenders, other polymers, and the like. They can be cured through crosslinking and/or chain extension, e.g., by heating at temperatures up to about 480° C in the presence of a free oxygen-containing gas, to provide cured products having high thermal stability and good chemical resistance. They are useful in the production of coatings, films, molded objects, and fibers. Those arylene sulfide polymers having a relatively low melt flow, e.g., within the range of about 1 to about 700 (determined by the method of ASTM D 1238-70, modified to a temperature of 316° C using a 5-kg weight, the value being expressed as g/10 min.), are particularly useful in the production of fibers, molded objects, and films since the usual curing step is obviated.

EXAMPLES

In the following Examples, values for melt flow were determined by the method of ASTM D 1238-70, modified to a temperature of 600° F (316° C) using a 5-kg weight, the value being expressed as g/10 min.

EXAMPLE I

In a control run outside the scope of this invention, poly(p-phenylene sulfide) was produced without the use of carbon dioxide.

To a stirred 95-gallon (360-liter) reactor were charged 25.0 gallons (96.8 kg, 0.97 kg-mole) N-methyl-2-pyrrolidone and 85.0 lb (38.6 kg, 0.378 kg-mole) lithium acetate dihydrate. The resulting mixture was then dehydrated by heating to a distillation temperature of 350° F (177° C), yielding 30.0 lb (13.6 kg) of distillate containing 29.2 lb (13.2 kg) water and 0.8 lb (0.4 kg) N-methyl-2-pyrrolidone. The reactor was then cooled to 250° F (121° C). To the residual mixture was added and aqueous solution containing 0.373 kg-mole sodium sulfide and 0.073 kg-mole sodium hydroxide, this aqueous solution having been prepared by mixing 76.8 lb (34.8 kg) of an aqueous solution of sodium hydroxide containing 39.2 lb (17.8 kg, 0.445 kg-mole) sodium hydroxide with 72.2 lb (32.7 kg) of an aqueous solution of sodium bisulfide containing 46.1 lb (20.9 kg, 0.373 kg-mole) sodium bisulfide, after which 13.5 gallons (52.2 kg, 0.53 kg-mole) N-methyl-2-pyrrolidone was added. Dehydration of the mixture by heating to a distillation temperature of 350° F (177° C) yielded 58 lb (26.3 kg) of distillate containing 57.2 lb (25.9 kg) water and 0.8 lb (0.4 kg) N-methyl-2-pyrrolidone. To the residual mixture was added 124.7 lb (56.6 kg, 0.385 kg-mole) p-dichlorobenzene. The resulting mixture was heated to 510° F (266° C) and maintained at this temperature for 5 hours at a pressure of about 136 psig. Samples of poly(p-phenylene sulfide) taken from the reactor at the end of the first hour, the end of the second hour, and the end of the fifth hour of this 5-hour period, after washing with water and drying, had melt flows of 256, 194, and 266, respectively. The reaction mixture was concentrated by removing 142 lb (64.4 kg) of distillate containing 12.5 lb (5.7 kg) water and 129 lb (58.5 kg) N-methyl-2-pyrrolidone, the distillation being conducted under conditions such that the initial pressure was 137 psig and the initial pot temperature was 511° F (266° C), and the final pressure was 28 psig and the final pot temperature was 488° F (253° C). The reactor containing the residual mixture was quickly pressured with steam to 150 psig to inhibit discoloration of the polymer during further processing, and the resulting mixture was then heated to 540° F (282° C), after which the reactor was pressured with nitrogen to 150 psig. The mixture was then fed to a blender, during which time the water and most of the N-methyl-2-pyrrolidone volatilized. The remaining N-methyl-2-pyrrolidone was removed by distillation over a period of 2 hours, the final temperature of the residual product being 440° F (227° C). The resulting solid material was cooled, washed three times with water, and dried. The poly(p-phenylene sulfide) product had a melt flow of 1538.

EXAMPLE II

In this run, poly(p-phenylene sulfide) was produced in accordance with the process of this invention, with carbon dioxide added during the polymerization step.

To a stirred 95-gallon (360-liter) reactor were charged 25.0 gallons (96.8 kg, 0.97 kg-mole) N-methyl-2-pyrrolidone and 85.0 lb (38.6 kg, 0.378 kg-mole) lithium acetate dihydrate. The resulting mixture was then dehydrated by heating to a distillation temperature of 350° F (177° C), yielding 25.0 lb (11.3 kg) of distillate containing 24.4 lb (11.1 kg) water and 0.6 lb (0.3 kg) N-methyl-2-pyrrolidone. The reactor was then cooled to 250° F (121° C). To the residual mixture was added an aqueous solution containing 0.373 kg-mole sodium sulfide and 0.073 kg-mole sodium hydroxide, this aqueous solution having been prepared by mixing 76.8 lb (34.8 kg) of an aqueous solution of sodium hydroxide containing 39.2 lb (17.8 kg, 0.445 kg-mole) sodium hydroxide with 72.2 lb (32.7 kg) of an aqueous solution of sodium bisulfide containing 46.1 lb (20.9 kg, 0.373 kg-mole) sodium bisulfide, after which 13.5 gallons (52.2 kg, 0.53 kg-mole) N-methyl-2-pyrrolidone was added. Dehydration of the mixture by heating to a distillation temperature of 350° F (177° C) yielded 59.0 lb (26.8 kg) of distillate containing 58.1 lb (26.4 kg) water and 0.9 lb (0.4 kg) N-methyl-2-pyrrolidone. To the residual mixture was added 125 lb (56.7 kg, 0.386 kg-mole) p-dichlorobenzene. The resulting mixture was heated to 510° F (266° C) and maintained at this temperature for 2 hours at a pressure of 135–139 psig. Samples of poly(p-phenylene sulfide) taken from the reactor at the end of the first hour and the end of the second hour of this 2-hour period, after washing with water and drying, had melt flows of 251 and 121, respectively. To the reactor was then added 5.7 lb (0.059 kg-mole) carbon dioxide at 200 psig over a period of 2 hours 15 minutes. The reactor was then maintained at 510° F (266° C) for 45 minutes, during which time the reactor pressure dropped to 160 psig. The melt flow of a sample, washed with water and dried, of the resulting poly(p-phenylene sulfide) was 61. The reaction mixture was concentrated by removing 137.0 lb (62.1 kg) of distillate containing 15.3 lb (6.9 kg) water and 121.0 lb (54.9 kg) N-methyl-2-pyrrolidone, the distillation being conducted under conditions such that the initial pressure was 165 psig and the initial pot temperature was 513° F (267° C), and the final pressure was 18 psig and the final pot temperature was 480° F (249° C). The reactor containing the residual mixture was quickly pressured with steam to 150 psig to inhibit discoloration of the polymer during further processing, and the resulting mixture was then heated to 540° F (282° C), after which the reactor was pressured with nitrogen to 150 psig. The mixture was then fed to a blender, during which time the water and most of the N-methyl-2-pyrrolidone volatilized. The remaining N-methyl-2-pyrrolidone was removed by distillation over a period of 2 hours, the final temperature of the residual product being 442° F (228° C). The resulting solid material was cooled, washed three times with water, and dried. The poly(p-phenylene sulfide) product had a melt flow of 145.

Thus, the melt flow of poly(p-phenylene sulfide) produced in the run of this Example was far less than that of the poly(p-phenylene sulfide) obtained in the control run of Example I.

I claim:

1. A method for producing polymers comprising:
   a. forming a composition by contacting a p-dihalobenzene represented by the formula

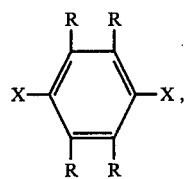

where each X is selected from the group consisting of chlorine, bromine, and iodine, and each R is selected from the group consisting of hydrogen and hydrocarbyl in which the hydrocarbyl is an alkyl, cycloalkyl, or aryl radical or combination thereof, the total number of carbon atoms in each molecule being within the range of 6 to about 24, with the proviso that in at least 50 mole percent of the p-dihalobenzene employed each R must be hydrogen, with an alkali metal sulfide, an alkali metal hydroxide, N-methyl-2-pyrrolidone, carbon dioxide, and a compound chosen from among an alkali metal carboxylate and a lithium halide, and
   b. maintaining at least a portion of said composition at polymerization conditions for a time sufficient to produce a polymer.

2. A method of claim 1 further comprising:
   a. contacting said alkali metal sulfide, said alkali metal hydroxide and N-methyl-2-pyrrolidone to form a first composition;
   b. dehydrating said first composition to produce a dehydrated first composition;
   c. contacting said p-dihalobenzene, said lithium halide, and carbon dioxide with said dehydrated first composition at polymerization conditions; and
   d. removing water and N-methyl-2-pyrrolidone from the polymerized mixture.

3. A method of claim 2 wherein a polyhalo aromatic compound having more than two halogen substituents per molecule is contacted with said p-dihalobenzene, lithium halide, and $CO_2$ in step (c).

4. A method of claim 1 further comprising:
   a. contacting said alkali metal sulfide, said alkali metal hydroxide and N-methyl-2-pyrrolidone to form a first composition;
   b. dehydrating said first composition to produce a dehydrated first composition;
   c. contacting said p-dihalo benzene and said lithium halide with said dehydrated first composition at polymerization conditions;
   d. upon completion of polymerization, contacting $CO_2$ with the polymerized mixture; and
   e. removing water and N-methyl-2-pyrrolidone from the polymerized mixture.

5. The method of claim 4 wherein a polyhalo aromatic compound having more than two halogen substituents per molecule is contacted with p-dihalobenzene and said lithium halide in step (c).

6. A method of claim 1 further comprising:
   a. contacting said alkali metal carboxylate in hydrated form and N-methyl-2-pyrrolidone to form a first composition;
   b. dehydrating said first composition to form a first dehydrated composition;
   c. contacting said alkali metal hydroxide and said alkali metal sulfide, said alkali metal sulfide in a form chosen from its hydrate and an aqueous mixture of said alkali metal sulfide, with said first dehydrated composition to form a second hydrated composition
   d. dehydrating said second composition to form a second dehydrated composition;
   e. contacting said p-dihalobenzene and carbon dioxide with said dehydrated second composition at polymerization conditions; and
   f. removing water and N-methyl-2-pyrrolidone from the polymerized mixture.

7. A method of claim 6 wherein a polyhalo aromatic compound having more than two halogen substituents per molecule is contacted with said p-dihalobenzene and said carbon dioxide in step (e).

8. A method of claim 1 further comprising:
   a. contacting said alkali metal carboxylate in hydrated form and N-methyl-2-pyrrolidone to form a first composition;
   b. dehydrating said first composition to form a first dehydrated composition;
   c. contacting said alkali metal hydroxide and said alkali metal sulfide, said alkali metal sulfide in a form chosen from its hydrate and an aqueous mixture of said alkali metal sulfide, with said first dehydrated composition to form a second hydrated composition;
   d. dehydrating said second composition to form a second dehydrated composition;
   e. contacting said p-dihalobenzene with said dehydrated second composition at polymerization conditions;
   f. upon completion of polymerization, contacting $CO_2$ with the polymerized mixture; and
   g. removing water and N-methyl-2-pyrrolidone from the polymerized mixture.

9. A method of claim 8 wherein a polyhalo aromatic compound having more than two halogen substituents per molecule is contacted with p-dihalobenzene in step (e).

10. A method of claim 1 wherein the ratio of carbon dioxide to alkali metal hydroxide is within the range of about 0.5:1 to about 1:1, the ratio of alkali metal hydroxide to alkali metal sulfide is within the range of about 0.008:1 to about 0.8:1 and the ratio of p-dihalobenzene to alkali metal sulfide is within the range of about 0.9:1 to about 2:1.

11. The method of claim 10 wherein the polymerization conditions comprise reaction temperature within the range of about 220° C to about 330° C, a reaction pressure sufficient to maintain the N-methyl-2-pyrrolidone, the p-dihalobenzene, and the polyhalo aromatic compound having more than two halogen substituents per molecule, if used, substantially in the liquid phase, and a reaction time in the range of about 10 minutes to about 72 hours.

12. A method of claim 6 wherein the alkali metal carboxylate is lithium acetate, the alkali metal hydroxide is sodium hydroxide, the alkali metal sulfide is sodium sulfide, and the p-dihalobenzene is p-dichlorobenzene, the reaction temperature is in the range of about 230° C to about 300° C and the reaction time is in the range of about 1 hour to about 8 hours.

* * * * *